United States Patent [19]
Crozer

[11] Patent Number: 5,116,408
[45] Date of Patent: * May 26, 1992

[54] WATER-BASED WOOD STAIN

[76] Inventor: Veva W. Crozer, 19 Rockwood La., Greenwich, Conn. 06830

[*] Notice: The portion of the term of this patent subsequent to Dec. 11, 2007 has been disclaimed.

[21] Appl. No.: 622,429

[22] Filed: Dec. 5, 1990

Related U.S. Application Data

[63] Continuation-in-part of Ser. No. 329,017, Mar. 27, 1989, Pat. No. 4,976,782.

[51] Int. Cl.$^5$ ............................................. C09D 15/00
[52] U.S. Cl. ........................................ 106/19; 106/24; 106/30; 106/32; 106/34; 106/311
[58] Field of Search ............... 106/19, 24, 30, 32, 106/34, 311; 8/402

[56] References Cited

U.S. PATENT DOCUMENTS

| | | | |
|---|---|---|---|
| 2,302,837 | 11/1942 | Bucy | 106/34 |
| 3,391,081 | 6/1968 | Conrady | 106/32 |
| 4,366,627 | 1/1983 | Hager et al. | 8/402 |
| 4,386,180 | 5/1983 | Lat et al. | 106/34 |
| 4,432,797 | 2/1984 | Vasishth et al. | 106/3 |
| 4,750,934 | 6/1988 | Metzner et al. | 106/18 |
| 4,792,356 | 12/1988 | Ruldolphy et al. | 106/239 |
| 4,814,016 | 3/1989 | Adkins et al. | 106/250 |

*Primary Examiner*—William R. Dixon, Jr.
*Assistant Examiner*—Helene Klemanski
*Attorney, Agent, or Firm*—Levisohn, Lerner & Berger

[57] ABSTRACT

A composition for use as wood stain comprises water, a cosolvent such as glycol, a system binder such as mineral oil, baby oil or a long-oil alkyd resin emulsion, and a printing ink dispersion as the coloring agent. The composition is transparent and translucent, easy to apply, quick to dry, does not separate into components or phases and can be formulated in a large variety of vivid and uniform colors. Thus, a water-based wood stain is provided which is expected to meet or exceed expected United States Environmental Protection Agency standards. A principal advantage of the composition is provision of an enormous range of colors which can be certified as consistent in color match by existing color specification systems, e.g., Pantene color matching system.

10 Claims, No Drawings

WATER-BASED WOOD STAIN

This is a continuation-in-part of copending application Ser. No. 07/329,017, filed Mar. 27, 1989, now U.S. Pat. No. 4,976,782.

BACKGROUND OF THE INVENTION AND DESCRIPTION OF THE PRIOR ART

The present invention relates to compositions for use in staining wood, and more particularly to a water-based wood stain composition available in a large variety of colors.

Ideally, a superior wood staining composition is characterized by uniformity of application in a wide range of colors and durability. Uniformity of application is affected, in part, by the rheological characteristics of the composition as well as by other factors such as the drying time of the composition. In the practical application of a stain to a wood surface, it is desirable that the stain impart a consistent color throughout the area of application. The stain should be "forgiving," i.e., in typical applications, an area of a wood surface is first coated with stain, and then an abutting second area may be stained. A common problem occurs in the area of overlap between the first area and second area wherein more color is imparted when compared to the unoverlapping areas. A "forgiving" stain is less likely to impart an area of enhanced color and thus creates a uniform color composition at the wood surface.

For commercial production purposes, a superior wood stain would, among other things, be economical, available in a large variety of colors, and consistently reproducible from batch to batch. The colors should be vibrant and clear and capable of being subject to manipulation such that they could range from transparent to opaque.

There are two basic forms of wood stains: oil-based and water-based. Oil based stains have been in long use and are capable of performing adequately in most respects. In such stains the oil base acts as a vehicle for carrying the colorant of the composition. However, more often than not, such compositions require lengthy drying times after application to a wood surface. Moreover, the Environmental Protection Agency is implementing restrictions such as the Clean Air Act of 1990 which will reduce or eventually eliminate oil-based wood stains from the market. Accordingly, the need exists for a quick-drying wood stain composition which will comply with EPA regulations.

Water-based compositions for covering wood have been proposed in the past and are available on the market. However, water-based latex paint compositions which include pigment and glycerin as components, sit on the surface of the wood, are semiopaque and tend to hide the natural grain of the wood surface. Water-based compositions including water-soluble aniline dyes as a component have also been developed. See, for example, U.S. Pat. No. 1,930,178 to Bucy and U.S. Pat. No. 1,930,178 to Mizener. However, aniline dye based stain compositions are relatively coarse and difficult to handle during application. Moreover, color matching has been extremely difficult with aniline dyes.

Finally, water-based compositions containing pigment and alkyd resins have been formulated for use as wood stains. U.S. Pat. No. 4,386,180 to Lat et al. discloses a quick-drying water-based stain for wood comprising an acrylic latex, drying oil, ester gum, glycol, hydrocarbonaceous solvent and pigment. U.S. Pat. Nos. 4,432,797 and 4,276,329 teach water-based wood stains comprising pigment and an alkyd resin to give high viscosity and prevent pigment settling. However, such compositions are characterized by either complex binding systems or slow-drying components.

Accordingly, the need still exists for a wood stain composition which complies with EPA regulations, possesses adequate transparency to enhance the natural grain of the wood, is characterized by good absorption into wood and short drying periods, and can be simply and economically formulated in a wide variety of colors.

Ease of application by the consumer is also very important. The current composition, disclosed herein, is very "forgiving" and has an open time which allows the user to cover large areas without "lapping", i.e., overlapping problems, wherein the areas that overlap evince more or different color than those that do not.

SUMMARY OF THE INVENTION

It is an object of the present invention to provide a composition for staining wood possessed of the following characteristics: water base, good wood absorption, transparency after drying, ease of application and drying, simple formulation, reproducibility and wide color selection. Standardized and certifiable color matching to an enormous color range is also available by the present invention.

These and other objects are achieved in accordance with the present invention by a composition for use as a wood stain comprising 1) a coloring agent such as flexographic printing ink, 2) a system binder such as mineral oil, baby oil, or a long-oil alkyd resin emulsion, 3) a cosolvent such as a glycol or glycerin, and 4) water.

Acceptability by anticipated EPA standards and easy water clean-up are also provided by the present invention.

DETAILED DESCRIPTION OF THE PREFERRED EMBODIMENTS

In a first embodiment of the present invention, there is provided a composition for use as a wood stain including a coloring agent or pigment provider such as flexographic printing ink, a cosolvent such as a glycol or glycerin, a system binder such as mineral oil or baby oil, and water. The first component of the composition in this embodiment of the present invention is a flexographic printing ink as the coloring agent. A full discussion of flexographic printing inks can be found in the "Printing Ink Handbook" (4th Edition 1980) and "Flexography: Principles and Practices" (Third Edition 1980), the contents of both of which are incorporated by reference herein.

As used in the present invention, the term "flexographic printing ink" refers to water-based printing ink formulations conventionally used in flexographic printing processes. These are generally composed of about 20%–45% of a solvent, about 10%–20% of a cosolvent, about 20%–40% of a resin binder, about 10%–20% of at least one insoluble pigment, about 0.5%–1% of an antifoaming agent, about 0%–1% of a wetting agent and about 0%–2% of a wax. This combination is incorporated into a fluid pigment dispersion.

Vehicles for water-based flexographic printing inks comprise, for example, aqueous solutions of ammonia or amine-solubilized protein, casein, shellac, esterified fumarated rosins, acrylic copolymers, or their mixtures.

Those water-based inks can comprise alkaline solutions of acidic resins, i.e., water soluble resins similar to soap. They dry water-insoluble by evaporation of the ammonia, volatile amines or lower alcohols together with ethers and glycol ethers. The soapy nature of the vehicle helps wet and disperse pigments in much the same manner that hand soaps wet and disperse grease. The vehicle then acts as a carrier for the pigment and as a binder to affix the pigment to a surface.

While there exist oil-based or solvent-based flexographic printing inks; these are not contemplated for use in the present invention because of EPA restrictions.

The flexographic printing ink component of the composition of the present invention is a pigment provider. The vehicle constitutes an aqueous solution for the dispersion or suspension of a finely-ground solid pigment therein. A mixture of one or more of the pigments conventionally used in flexographic printing inks may be employed, thus enabling the selection of a huge variety of colorings depending on the desired final color of the wood stain. For example, the BASF Corporation provides a complete line of water-based printing inks including a tremendous variety and selection of pigments, thus facilitating the selection of any desired color for use in the present invention.

The second component of the composition in this embodiment of the present invention is a glycol, preferably glycerin. The glycol acts as a cosolvent, surfactant or suspending agent to form an emulsion of the flexographic printing ink pigment in water.

The third component of the composition in this embodiment of the present invention is a system binder such as mineral oil or baby oil. The system binder functions in the form of a loose matrix which generally keeps the system together, and, in combination with the other components of the stain, helps to impart many of the stain's desirable characteristics. For example, the system binder acts to increase the absorbency of the printing ink in water, thus facilitating the use of very liquid, high water content compositions, if desired. Moreover, the system binder acts as a retarder to drying, thus extending the useful life of the composition and making application of the stain very simple. Finally, the proportion of the system binder used in the composition can be varied to adjust the overall viscosity, drying time and color intensity of the composition.

The cosolvent and the system binder also operate together to diminish raising of the natural grain of the wood to which the composition is applied. Without these components, the water content of the composition would result in unsightly raising of the grain of the wood after application and a dry time that would be too fast for practical consumer application.

The fourth component of the composition in this embodiment of the present invention is water, which acts as the overall carrier or vehicle for the composition of the present invention and as a diluent for the pigment of the printers ink.

The relative proportions of the four basic components of the composition in this first embodiment of the present invention can be varied widely to affect the rheological properties of the composition and thus provide a product ranging from a thick creamy viscous liquid to a very thin liquid, depending on application requirements and the desired final appearance. A preferred composition is made of equal parts, by weight, of flexographic printing ink (the coloring agent), glycol (the cosolvent), oil (the system binder) and water. Additional surfactants and drying agents may be added in amounts up to about 5% by weight. Moreover, the flexographic printing ink component may range as high as 65% by weight, depending on the desired final viscosity of the composition, which may be varied as desired to achieve particular application requirements.

In an alternative and preferred embodiment of the present invention, there is provided a composition for use as a wood stain including water, a cosolvent such as a glycol, a coloring agent such as a flexographic printing ink, a system binder such as a long-oil alkyd resin, a metal drier for the alkyd resin, and an emulsifier for the alkyd resin.

In this embodiment, water is present in an amount ranging from about 10% to about 50% by weight of the total composition.

The flexographic printing ink includes the same water-based printing ink formulations conventionally used in flexographic printing processes which have already been described herein and is present in an amount ranging from about 0.5% to about 35% by weight of the total composition.

In this alternative embodiment, the glycol, which is not essential but is preferred, is present in an amount ranging from about 2.5% to about 12.4% by weight of the total composition. Ethylene glycol is an especially preferred glycol for use in this alternative composition although other glycols that are known to those with skill in the art are suitable to the instant composition. The glycol acts as a cosolvent, wetting agent and coalescing agent for the alkyd, to be described below, when the composition is applied to a wood surface. The glycol also acts as an antifreeze agent, i.e., it prevents freezing of the formulation and lowers the viscosity.

The long-oil alkyd resin acts as a system binder and is somewhat akin to the mineral oil or baby oil recited above. The system binder is present in an amount ranging from about 10% to 50% by weight of the total composition, is not soluble in water, and is prepared from well-known drying oils in a conventional manner.

Alkyd resins are well-known per se. Basically, alkyd resins are oil-modified polyesters, and are constituted of 100% solids. Generally, alkyd resins can be defined as polyesters of polyhydroxyl alcohols and polycarboxyl acids chemically combined with the acids of various drying, semi-drying and non-drying oils in various proportions. The oil acids are coupled into the resin molecules by esterification during manufacture and become an integral part of the polymer.

Alkyd resins and their preparation are discussed in detail in *Principles of Surface Coating Technology* by Dean H. Parker, Chapter 16 (1965), published by Interscience Publishers, a division of John Wiley & Sons, the contents of which are incorporated herein by reference.

As is well-known in the art, alkyd resins are classified by their "oil length" as either short-oil, medium-oil or long-oil alkyd resins. "Oil length" is a well-known term referring to the percentage of oil in the resin. "Long-oil" alkyd resins, as used in the present invention and as generally known in the art, are defined as alkyd resins having an oil content of greater than 50%.

Well-known long-oil alkyd resins made from drying oils are suitable for use in the composition of the present invention. Short-oil and medium-oil alkyd resins, as well as long-oil alkyd resins made from semi-drying and non-drying oils, are not suitable for use in the present invention. Generally, a long oil resin has a higher percentage of vegetable oil which usually provides a more linear structure with less cross linking. By contrast, short oil lengths are less linear because there is less long chain vegetable oil and a greater opportunity for cross-linking which tends to result in a product which is more difficult to apply.

Long-oil alkyd resins made from drying oils are well-known in the art. Examples of drying oils from which long-oil alkyd resins are conventionally prepared include soybean oil and linseed oil. Such drying oils are chemically combined, for example, with phthalic anhydride, to provide long-oil alkyd resins. For example, a long-oil alkyd resin suitable for use in the present invention can be prepared by reacting in a well-known manner 70% by weight soybean oil and 30% by weight phthalic anhydride. The higher the oil content of the long-oil alkyd resin used, the better are the wiping properties of the final wood stain composition of the present invention.

The long-oil alkyd resin used in the present invention is a system binder and a "film-former", i.e., when emulsified it forms a loose matrix, acts as a vehicle to carry the flexographic printing ink pigment dispersion, and helps hold the system together.

An example of a well-known long-oil alkyd resin for use in the present invention is a long-oil alkyd resin sold under the name VARKYD K-2516-100 by McWorter, a soybean oil-based alkyd resin.

A metal drier is required to cure the alkyd resin. The drier acts as a catalyst for polymerization of the alkyd resin upon application of the composition to a wood surface, and is present in an amount ranging from about 0.01 to about 1% by weight of the total composition. Cobalt is an especially preferred metal drier for use in the art, which consist of 12% cobalt in a solution of 88% inert material.

While cobalt is the preferred drier, other well-known metal driers can be employed in the present invention, such as lead, manganese, calcium, zinc and zirconium.

In addition to the long-oil alkyd resin and metal drier, a surfactant is also required for emulsifying the long-oil resin used in the present invention.

The surfactant is a nonionic emulsifier in suspension and is present in an amount ranging from about 0.1 to about 5% by weight of the total composition. The nonionic emulsifier is provided to emulsify the alkyd resin. Well-known nonionic emulsifiers are suitable for use in the present invention. Generally, the emulsifier is first added to and mixed with the alkyd resin, after which water is slowly added to the resin/surfactant blend, as will be described in greater detail below. An emulsion results wherein the water provides a continuous phase and the emulsified alkyd resin provides a discontinuous phase.

An example of a suitable well-known nonionic emulsifier for use in the present invention is sold under the trade name IL-2395/U-89 by ICI. This nonionic emulsifier is characterized by an acid number of 5.0 maximum, a hydroxyl number of 102 to 119, a saponification number of 48 to 59, a water content of 3.0% maximum, and is soluble in water, isopropanol, ethylene glycol and cottonseed oil.

Although not critical to the composition of the present invention described in this alternative embodiment, it is preferred to also provide an acrylic polymer thickener and an amine.

Any of the well-known generic acrylic polymer thickeners are suitable for use in the present invention, and the thickener is present in an amount ranging from about 0.5 to about 10% by weight of the total composition. Such acrylic polymer thickeners are described in detail in U.S. Pat. No. 4,432,797, the description of which is incorporated herein by reference.

An example of a suitable acrylic polymer thickener for use in the present invention is sold under the generic tradename ASE-60.

When an acrylic polymer thickener is used, an amine must also be employed to maintain a proper pH in the composition. The amine is provided as an alkaline solution and is present in an amount ranging from about 0.06 to about 1.2% of the total composition. Such well-known amines raise the pH of the composition to activate the acrylic polymer thickener, thus increasing the viscosity of the composition. An example of an amine suitable for use in the present invention is 2-amino-2-methyl-1-propanol, obtainable from Sigma-Aldrich Corporation under the trade name AMP-95.

Accordingly, in this alternative embodiment of the present invention, in the system binder component, mineral oil or baby oil is replaced by a long-oil alkyd emulsion and, preferably, an acrylic polymer thickener and an amine for pH maintenance. This alternative composition is extremely advantageous in that it dries easily in one hour, while significantly longer drying times are sometimes necessary when the system binder is mineral or baby oil. Further, there is no phase separation in this alternative composition, meaning that the composition will not separate into 2 distinct phases, which can occur when the system binder is mineral or baby oil. Additionally, this composition possesses easy wiping and vivid, uniform color properties characteristic of the present invention. Moreover, application of this composition is "forgiving," i.e., a user can apply a long strip of the stain to wood and then apply an abutting strip without causing a limited area of enhanced color where the two strips overlap.

The present invention thus provides a water-based composition for use as a wood stain which meets EPA requirements, is simply formulated, non-toxic and substantially transparent upon drying, and can be prepared in a huge variety of colors.

EXAMPLE 1

A composition for use as a wood stain is formulated in accordance with the present invention from the following components:

| | | |
|---|---|---|
| 1. | Water | 25% by weight |
| 2. | Glycerin | 25% by weight |
| 3. | Mineral Oil | 25% by weight |
| 4. | BASF AQUALABEL high gloss prepackaged flexographic water-based printers ink | 25% by weight |

The composition possesses a moderate viscosity and is easily applied to a wood surface.

It has been discovered that this composition, in order to minimize separation between components, should be "blended" in the following preferred order:

1. Ink
2. Oil (mineral or baby)
3 Glycerin
4. Water

The addition of the glycerin facilitates the addition of more of the oil component and creates a more fluid composition. If no glycerin is used and too much oil is added, the mixture would separate and blending, i.e., true mixing could not further take place without the addition of more of the ink component. Adding additional ink, however, is not desirable since it may prevent attaining color uniformity from batch to batch.

EXAMPLE 2:

A composition for use as a wood stain is formulated in accordance with the present invention from the following components:

|   | Parts by Weight (PBW) |
|---|---|
| 1. Water | 1668 |
| 2. Etheylene Glycol | 180 |
| 3. VARKYD K-2516-100 long-oil alkyd resin | 726 |
| 4. 12% Cobalt drier | 3 |
| 5. IL2395 U-89 nonionic emulsifier | 72 |
| 6. ASE-60 acrylic thickener | 51 |
| 7. AMP amine | 6 |
| 8. BASF AQUALABEL flexographic printing ink dispersion | 290 |
| TOTAL PBW | 3000 |

The method of preparing the composition of the alternative embodiment of the present invention will now be described in the context of preparation of the above formulation.

The composition is prepared by blending the various components in a conventional mixing vessel or dispenser having a mixing blade mounted on a shaft rotated by a motor.

The alkyd resin is first weighed into the mixing vessel and agitated by starting the motor to rotate the mixing blade. The metal drier is then added to the vessel, followed by the ethylene glycol. The contents are mixed until evenly intermixed, after which the nonionic emulsifier is added. Mixing continues until the contents are homogeneously blended, after which the water component is added. Mixing continues for approximately 5 to 10 minutes until a thin emulsion forms. After the water is added, and during the subsequent mixing, an inversion takes place. Specifically, when the water is added to the vessel, there initially exists a water-in-oil phase emulsion. As mixing continues, the emulsion inverts to an oil-in-water phase emulsion.

Once a thin oil-in-water emulsion forms, the acrylic polymer thickener is added and mixed-in. The amine is then added to the vessel to raise the pH of the mixture to activate the thickener and raise the viscosity of the composition. Generally, the amine raises the pH of the composition to a range of about 8 to 8.5. Blending continues for about 5 to 10 minutes, after which the flexographic printing ink pigment dispersion is added to the vessel. Mixing continues until the pigment dispersion is blended into the water phase of the composition. Preparation of the composition is then completed.

The above-prepared composition possesses a moderate viscosity, is easily applied to a wood surface and dries to the touch in about an hour. The composition is further characterized by easy wiping properties, vivid and uniform color, produces a minimum raising of the wood grain, and avoids overlapping when used.

Additionally, wood stain compositions in accordance with the instant invention provide a window of opportunity while drying in which to rectify mistakes that may have occurred during application of the stain. For example, if a can containing the stain is placed on wood which is to be stained and the can has stain which dripped or leaked down to the lower rim, a round stain mark or "burn mark" would be applied to the wood under the can. However, the "burn mark" is easily resolubilized while it dries which permits corrective action to be taken.

It should be appreciated that the wood, after staining, should generally be allowed to dry for about 24 hours before top coating with an oil-based urethane. If, however, top coating is to be done with a water-based urethane, compositions may need up to 72 hours of drying to prevent color distortions upon application of the top coating.

It will be appreciated that while the present invention has been described with reference to specific and preferred embodiments thereof, this is not done by way of limitation, and various modifications will suggest themselves to those of ordinary skill in the art which fall within the spirit and scope of the present invention as set forth in the appended claims.

What is claimed is:

1. A composition for use as a wood stain comprising, by weight of the total composition, about 0.5% to about 35% of a water based flexographic printing ink, about 2.5% to about 12.4% of a glycol, about 10% to about 50% of a system binder, and about 10% to about 50% water, wherein said water-based flexographic printing ink is comprised of an alkaline solution of an acidic resin and at least one pigment dispersed in said resin.

2. A composition for use as a wood stain comprising, by weight of the total composition, about 0.5% to about 35% of a water-based flexographic printing ink, about 2.5% to about 12.4% of a glycol, about 10% to about 50% of a system binder, and about 10% to about 50% water, wherein said water-based flexographic printing ink is comprised of at least one pigment dispersed in a vehicle selected from the group consisting of ammonia or amine-solubilized protein, casein, shellac, esterified fumarated rosins, acrylic copolymers and mixtures thereof.

3. A composition for use as a wood stain comprising, by weight of the total composition, about 0.5% to about 35% of a water-based flexographic printing ink, about 2.5% to about 12.4% of a glycol, about 10% to about 50% of a system binder, and about 10% to about 50% water, wherein said flexographic printing ink is a fluid pigment dispersion comprised of about 20% to about 45% solvent, about 20% to about 40% resin binder comprising an alkalized soluble resin neutralized with ammonia or amine, about 10% to about 20% insoluble pigment, about 10% to about 20% cosolvent, about 0.5% to about 1% antifoaming agent, about 0% to about 1% of a wetting agent, and about 0% to about 2% of a wax.

4. A composition as in claim 1, wherein said glycol is selected from the group consisting of glycerin and ethylene glycol.

5. A composition as in claim 2, wherein said glycol is selected from the group consisting of glycerin and ethylene glycol.

6. A composition as in claim 3, wherein said glycol is selected from the group consisting of glycerin and ethylene glycol.

7. A method of producing a water-based satin comprising:

a. mixing a system binder with a glycol to form a mixture;
b. adding water to the mixture and forming an emulsion; and
c. Adding a water-based flexographic printing ink to the emulsion, said flexographic printing ink being selected from the group consisting of an alkaline solution of an acidic resin and at least one pigment dispersed in said resin; at least one pigment dispersed in a vehicle selected from the group consisting of ammonia or amine-solubilized protein, casein, shellac, esterified fumarated rosins, acrylic copolymers and mixtures thereof; and a fluid pigment dispersion comprised of about 20% to about 45% solvent, about 20% to about 40% resin binder comprising an alkalized soluble resin neutralized with ammonia or amine, about 10% to about 20% insoluble pigment, about 10% to about 20% cosolvent, about 0.5% to about 1% antifoaming agent, about 0% to about 1% of a wetting agent, and about 0% to about 2% of a wax.

8. A method of providing consistent color throughout an area of application, wherein successive abutting applications of wood stain overlap, comprising one or more successive applications of the composition of claim 1 to wood.

9. A method of providing consistent color throughout an area of application, wherein successive abutting applications of wood stain overlap, comprising one or more successive applications of the composition of claim 2 to wood.

10. A method of providing consistent color throughout an area of application, wherein successive abutting applications of wood stain overlap, comprising one or more successive applications of the composition of claim 3 to wood.

* * * * *